March 26, 1929. J. L. PREO ET AL 1,706,497
MACHINE FOR PREPARING HEEL SEATS
Filed Oct. 14, 1921 9 Sheets-Sheet 1

Fig.1.

INVENTORS
ATTORNEY

March 26, 1929.   J. L. PREO ET AL   1,706,497
MACHINE FOR PREPARING HEEL SEATS
Filed Oct. 14, 1921   9 Sheets-Sheet 6

Patented Mar. 26, 1929.

1,706,497

UNITED STATES PATENT OFFICE.

JOHN LAKE PREO AND ISABELLE HENNE, OF NEW YORK, N. Y., ASSIGNORS TO UNITED SHOE MACHINERY CORPORATION, OF PATERSON, NEW JERSEY, A CORPORATION OF NEW JERSEY.

MACHINE FOR PREPARING HEEL SEATS.

Application filed October 14, 1921. Serial No. 507,614.

This invention relates to machines for use in the manufacture of boots and shoes and is herein illustrated as embodied in a machine for use in preparing the heel-seats of shoes for the reception of wood or other heels to be attached thereto.

In the preparation of the rear portion of a shoe bottom for the reception of a heel such as a wood heel, that is, a heel having on its seat face a scoop-shaped or "cupped" attaching surface surrounded by a rim, two operations are preferably performed. The first operation, called "heel-seat fitting," consists in removing material from the margin of the rear portion of the outsole (or sole in the case of a shoe having a single sole), in which operation the upper material about the periphery of the heel-seat is exposed. The second operation, called "heel-seat forming", consists in molding the materials of the heel-seat, that is, the reduced rear end of the sole and the overlasted upper materials, into a convex shape corresponding substantially to the concavity or cup in the attaching surface of the heel. Preferably the heel-seat of the shoe is thus shaped to provide a groove about the periphery of the heel-seat in which the rim of the attaching surface of the heel may rest, thereby forming a tight joint with the upper.

During the heel-seat molding operation, the rear portion of the shoe upper adjacent to the heel-seat is often pounded to shape it to the last.

Objects of this invention are to provide a machine for performing the heel-seat forming operation with greater speed, convenience and effectiveness than has heretofore been possible and to provide improved means for effecting the shaping of the upper about the rear portion of the shoe in conjunction with the heel-seat forming operation.

A feature of the invention consists in an organization comprising a die for producing localized pressure on the heel-seat of a shoe to impart thereto a conformation corresponding approximately to the attaching surface of a wood heel, a shoe support for sustaining the last for the operation of the die, and two cooperating devices or mechanisms for effecting relative movement of the die and shoe support.

The first of said devices is preferably constructed and arranged for operation to apply a relatively light primary pressure during which the relative position of the die and heel-seat may be inspected and, if necessary, corrected, and the second device is constructed and arranged to apply a heavy secondary pressure to extend and complete the molding operation. In the illustrated machine the primary mechanism is operated through a foot treadle and a system of link and lever members, a clutch or locking element releasable by hand being provided to maintain the primary pressure. The secondary mechanism includes a cam operated by hand and located between the die and its support. If desired, the two mechanisms may be used alternately and repeatedly to build up high pressure on the heel-seat. The mechanism is therefore adapted to meet varying conditions of the work such as the variable amount of moisture content and the varying strength and delicacy of the leather or fabric used.

Another feature of the invention consists in shoe holding and shaping means by which the upper and counter at the rear portion of the shoe are conformed to the last during the operation of shaping the heel-seat, and preferably the organization is such that the greater the pressure of the die upon the heel-seat the greater will be the pressure applied by said means for conforming the upper and counter to the last. As illustrated, the shoe holder comprises a pair of jaws adapted to embrace the rear end of the shoe, the jaws having cushion inserts which conform substantially to the shape of the last. Operative connections comprising toggles are provided for closing the jaws upon the shoe. The jaws are mounted for bodily vertical movement to adjust them to the height of the last and the arrangement is such that the vertical adjustment of the jaws does not disturb the operating connections. The jaws preferably and as shown have operative connections with the treadle by which the primary pressure is produced.

These and other features of the invention will appear more fully from the following detailed description when read in connection with the accompanying drawings and will be pointed out in the appended claims.

Numerous other features and advantages of the machine will be described in the following specification and illustrated in the drawings, of which

The machine shown in the drawings consists of two units mounted on a base or frame 1, which may be made of two side uprights tied together by cross-bars 2, upon which the main frame castings 3 of the two units are mounted. While two units are shown, thus taking care of two shoes, it is obvious that any number of units might be mounted on a base proportionally longer. Only one of the units will be described, as they are duplicates with the exception of slightly differing shapes in the shoe-holding mechanism to take care of right and left shoes.

A treadle lever 4 for each unit is fulcrumed toward the back and in the lower portion of the base 1, on a bolt 5, extending from side to side of the machine, and has pivoted thereto at 6, intermediate its fulcrum and its forwardly projecting pedal portion, a pull-rod 7, through which the mechanism is operated. A tension spring 8 secured to the treadle lever and to a fixed part of the machine tends to pull the treadle upwards and restore the operating parts of the machine to the normal, open position shown in Fig. 1, and does so when a handle 9 is moved upward to release a holding device or clutch of the unit, designated as a whole 10.

Figure 11:
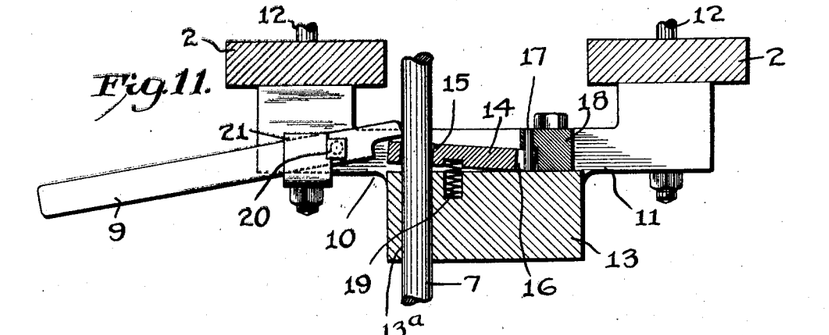
Fig. 11 is a detail sectional view taken on the line 11—11 of Fig. 10.

This holding device of the preferred embodiment is mounted in a sub-frame 11 (Fig. 11) to act upon the pull-rod, this sub-frame being shown as common to the two units and secured to the cross-bars 2 by bolts 12, which also hold the main frame casting 3 in position. A large lug or bracket extension 13 on each side of the sub-frame 11 provides a place for mounting the clutch-plate 14, which has a hole 15 through it for the passage of the operating rod, this hole being very slightly larger from front to rear than the diameter of the rod. The plate lies upon the flat top of the bracket or support 13, which is also apertured at 13$^a$ to guide the pull-rod, and its rear end is closely overhung by a jut 18$^a$ on a block 18 which is firmly bolted on the bracket. This retainer keeps the clutch-plate from bodily upward movement with the rod, while permitting sufficient tilting for its purpose. A pin 17 projecting downward from the jut 18$^a$ and freely within a notch 16 in the rear end of the plate prevents the latter from becoming displaced laterally. This plate 14 is normally tilted slightly upward by a light spring 19 beneath it, so as to be in position to grip the pull-rod with the diagonally opposite corners of its slightly enlarged hole 15. Consequently if the rod 7 is pulled down it will be automatically and positively caught and held against upward movement as soon as the pressure on the treadle is removed. The rear end of the handle-lever 9 overlies the forward portion of the clutch-plate, from which it follows that slight lifting of the handle depresses the clutch-plate so as to release the rod to move upward under the action of the spring 8. The said handle-lever is shown pivoted at 20 to the sub-frame, with a bracket 21 arranged to limit its downward movement and to block the pivot-screw 20 against unscrewing.

The rod 7 has threaded or secured on its upper part a suitable block 22 (Fig. 1), to which are pivoted at 23 the lower ends of a pair of bars 24 constituting a pull-link.

The upper ends of these bars are pivoted at 25 to the front ends of another pair of bars 26, forming a two-armed lever, which is fulcrumed between its ends at 27 to an extension 28 from the frame 3, the power arm of this lever being materially longer than its rear work arm. To the rear end of the lever 26 is pivoted at 29 a short link 30, which is pivotally connected at 31 with the rear ends of a pair of bars 32 forming another lever also extending forwardly and rearwardly of the machine, above the lever 26. The lever 32 is fulcrumed between its ends at 33, at a point in advance of the fulcrum 27, on a frame extension 34, and serves further to increase the power and to transmit the greatly magnified foot pressure in a downward direction at its forwardly projecting front end, to a vertical slide or plunger 39, which will again be referred to. The levers in their double-bar construction and substantial vertical depth are adapted to transmit and sustain very heavy pressures. The pull-rod 7 and long link 24 together constitute a tension or pull connection between the operating lever or treadle and the levers in the superstructure of the machine.

On the front end of the lever 32, on a pin 35, is a cam 36, which has a handle 37 for operating it. This cam 36 constitutes a secondary pressure device interposed in the transmission of the primary operating and pressure mechanism actuated by the treadle, and in the preferred embodiment bears against a roller 38 which is mounted on the upper end of the vertical plunger or slidable die-carrier 39 (Figs. 8 and 9), which has an enlargement 39ª at its lower end to carry the die 44 and its positioning devices. The latter include a horizontal transverse slot 40 in the bottom of the enlargement, an intermediate member 41 having a dovetail tongue on top slidably fitting said slot and a dovetail slot 42 in its bottom at right angles to the upper dovetail slide, and a dovetail tongue 43 on the top of the die slidably fitting this lower slot. A screw rod 46, having a knurled head 47, and mounted in the enlargement 39ª so as to be rotatable while held against longitudinal movement, serves to move the member 41 for lateral position and to hold it in any position, the intermediate threaded portion of the rod being in engagement with an internally threaded lug on the top of the member. The die is slidable in the member 41 for fore and aft position and is held at any position by a set-screw 48 bearing against a gib 49. By these devices the die can be accurately positioned with reference to the heel seat of any kind or style of shoe. The movements of the die relative to the bottom of the plunger are slight; and in any operating condition the die is substantially directly below the point of application of pressure upon the upper end of the plunger, and in line with the guide, the force being exerted entirely through the body of the plunger, any material springing or canting of the die and its carrier is impossible; the construction which insures this being comparatively simple and inexpensive.

Figure 12:
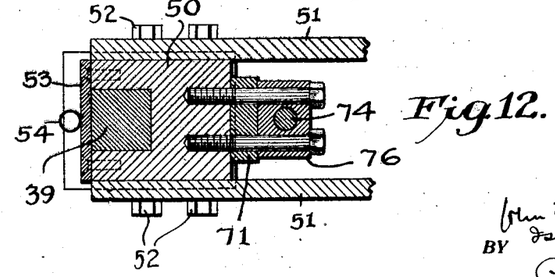
Fig. 12 is a detail sectional view taken on the line 12—12 of Fig. 1.
Figure 13:
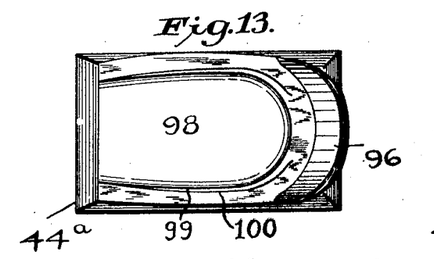
Fig. 13 is a bottom plan view of one form of die or mould.

The plunger 39 is accurately guided in its up and down movement by a guide block 50 (Fig. 12) which is secured to fixed frame members 51 by bolts 52, these members in turn being secured to or integral with the frame extensions 34. A front plate 53 secured to the guide block completes the guideway for the plunger 39. A spring 54 secured at one end to a yoke 55 on the double lever 32, and at its other end to the enlarged lower portion of the stem 39, pulls and holds the die away from the heel seat after the pressure has been relieved and the seat formed and prior to the insertion of a fresh shoe.

The mechanism thus far described is for the purpose of applying the pressure on the die to form the heel seat. The treadle 4, rod 7 and spring 8 also operate simultaneously a mechanism to grasp the shoe and hold it firmly so as to prevent the shoe from becoming distorted or forced out of shape by the heavy pressure applied on the die or mould, and also to position and hold the shoe accurately in relation to the descending die.

The shoe is supported during the operation of the mechanisms on a post 56 which is pivoted at its lower end at 57, in a slot in a forward extension 58 of the frame 3. This end of the post is beveled off at 59, so that when the post is swung forward in the dotted position shown in Fig. 1, to enable the operator to place or remove a shoe, it is sustained by the bevel face abutting the back wall of the slot as a stop. Pivoted on a transverse pivot 56ª in the upper part of the post is a block 60 carrying the last pin 61, which fits into a hole in the last a, carrying the shoe b. Coacting stop surfaces arranged on the post and block in front and rear of the pivot permit slight fore and aft rocking of the block on the post, and a spring 62 placed in a hole in the post and bearing against the rear part of the block 60 tends to tilt the block forward and holds it firm against the forward stop, although when the pressure is applied the block is permitted to tip slightly, which is desirable.

The mechanism previously mentioned which grasps the shoe upper at the region of the heel end will now be described. A pair of substantial, curved jaws 63 adapted to embrace the counter portion of the shoe upper and having lugs 64 at their outer sides are pivoted on vertical axes, at 64ª on these lugs, to the ends of a pair of horizontal levers 65. A horse-shoe shaped rubber insert 66 conforming substantially to the back and sides of the shoe, is carried by these jaws, being held in place by tongues 67 on the rear portions of the jaws fitting into corresponding grooves 67ᵃ on the insert, and by plates 68 secured to the front ends of the jaws and overlapping the ends of the insert, these plates also having tongues which fit into grooves 68ᵃ in the insert ends.

The levers 65 are fulcrumed intermediate their ends on vertical pivot pins 69 on a head or carrier 70, which is slidable up and down on a fixed vertical guide 71. As shown, the head is, for convenience of manufacture, made of pieces 70 and 72 secured together and embracing the guide, and another piece 75 forming a projection at the back of the guide. The portion 75 of the head is formed with a vertical internally threaded opening, which receives the screw-threaded lower portion of a vertical rotatable rod 74, having a hand-wheel 73 conveniently placed at its upper end. The rod at its intermediate part is journaled in a bracket 76 (Fig. 1) secured to the upper part of the guide bar 71, collars 77 on the rod at opposite sides of the bracket preventing any longitudinal movement of the rod. By rotating the hand-wheel 73 and thus turning the rod 74, the threaded part will work the head up or down, carrying with it the jaws 65 and certain parts of the mechanism for operating them. In this way the shoe-holder is positioned vertically, which is important for the satisfactory operation of the machine upon different kinds of shoes.

Figure 5:
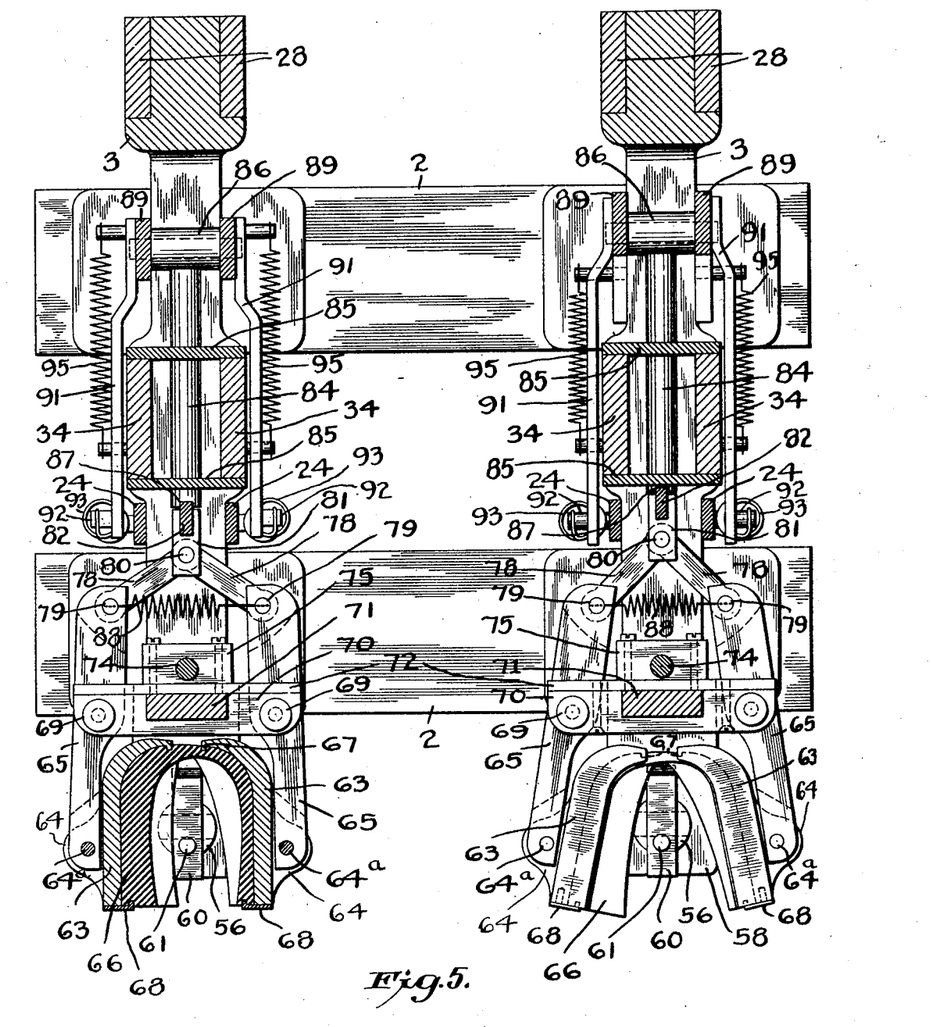
Fig. 5 is an enlarged sectional view taken approximately on the line 5—5 of Fig. 1. In this view the unit on the left-hand side shows the parts in the position when the pressure is being applied and the unit on the right-hand side shows the parts in the condition preparatory to the pressure being applied.
Figure 6:
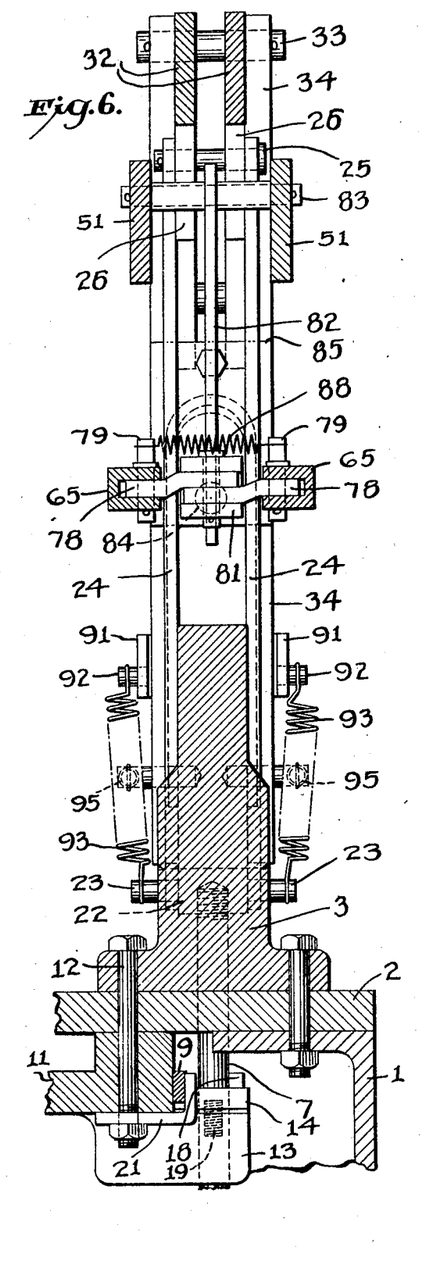
Fig. 6 is a vertical section taken on the line 6—6 of Fig. 1, looking in the direction of the arrows.
Figure 7:
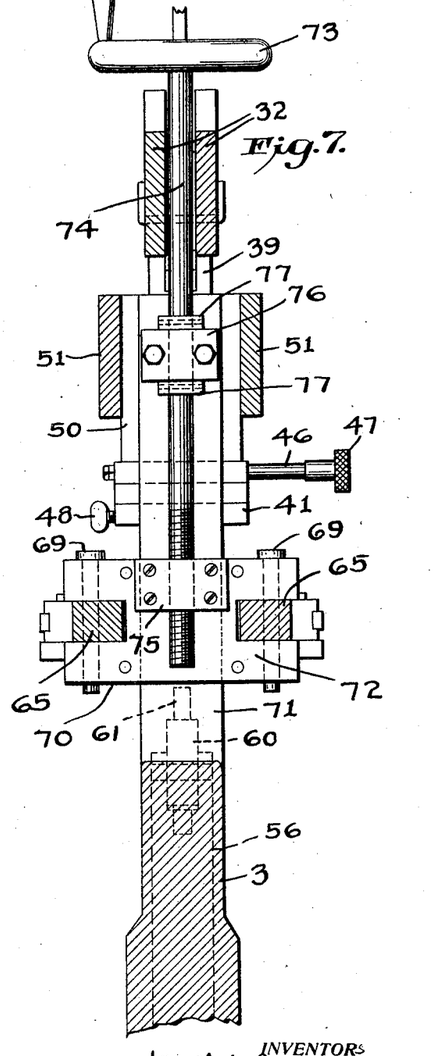
Fig. 7 is a vertical section taken on the line 7—7 of Fig. 1, looking in the direction of the arrow.

A pair of toggle links 78 are pivoted at 79 to the rear ends of the levers 65 and the inner ends of said links are pivoted at 80 to a central block 81. This block 81 is notched at its rear end to accommodate a generally vertical actuating arm or member 82, which is pivoted at its upper portion on a transverse axis 83 in the fixed part 51. A horizontal push-bar 84 slidably mounted in plates 85 secured to the frame extension 34 is arranged to bear at its forward end against the back of the upright member 82; and when forced forward acts through the medium of this member, block 81, links 78 and levers 64 to close the jaws 63 upon the shoe. At the right-hand side of Fig. 5 the jaws are shown in their open position, while at the left the rod 84 has been pushed forward and the jaws are closed. The upright actuating member 82 is provided so as to permit adjustment of the shoe-holder mechanism up and down by the hand-wheel 73 and rod 74, the block 81 being capable of moving with the shoe-holder along the said member, so that operative relation between the shoe-holder and its operating means is always maintained. The push-rod may be notched at its forward end, as shown at 87, to insure better engagement with the member 82. The spring 88 secured to the two pivots 79 opens the jaws when pressure has been relieved from the push-rod 84.

The push rod 84 is actuated at its rear end by one arm 89 of a bell-crank lever which is pivoted at 90 to the main frame 3, the said arm having a roller 86 for antifriction engagement with the rod. The other arm 91 of said bell-crank lever has secured to it at 92 a strong spring 93, the opposite end of which is fastened to the pivot 23 on the block 22 of the pull-rod 7. Thereby, when the treadle is pushed down, the bell-crank is actuated through the spring to advance the push-rod 84 and close the jaws. The strong spring 93 affords a yielding pressure so as not to injure the shoe and to compensate for different extents of movement of the die-operating mechanism. The bell-crank lever has a tailpiece 94 to which a spring 95 is connected, its opposite end being fastened to the frame 3, for the purpose of assisting in restoring the parts to normal position.

By virtue of the operation of the shoe-holder jaws by the main operating mechanism, and the yielding connection afforded by the spring 93, the shoe-holder is opened and closed automatically, and the pressure of the jaws is rendered impositive so as not to injure the shoe. Moreover, the greater the pressure on the heel seat exerted through the die, the more powerful will be the grasp of the holder on the shoe.

The preferred form of the heel seat die is illustrated more particularly in Figs. 8, 9, 13 and 14. The die is an integral block possessed of a smooth, continuous, concave, main working face 98 occupying all the interior of its bottom, this face being of a shape to produce under heavy pressure upon the heel seat of the shoe, a rounded conformation corresponding in reverse to the conventional cupped seating portion of a wooden heel. The working face of the die may be described as corresponding substantially to the cup of the heel, without excluding such slight deviations from exact duplication as may be desirable in view of the character, arrangement and behavior of the materials worked upon. The part worked on is, in the case of a sewed seat turn shoe, the area of the heel-seat including the rear portion of the sole and the inturned portion of the upper exposed by trimming away the margin of the sole. Surrounding and limiting the face 98 at the sides and back is a rim or edge 99, the function of which is to form a slight crease or channel around the heel seat proper of the shoe, substantially where the inturned portion of the upper terminates. In the ordinary hand method of preparing the seat, the operator crudely digs out a channel with an awl or similar tool around the line of stitching, and in so doing commonly destroys some of the stitching. He then takes a hammer and pounds the area within this channel, continuing the hammering with blows variously delivered until he has worked up on the outsole as satisfactory a heel seat as he can accomplish. With the illustrated die and machine, the seat is produced with accuracy and without injury to the stitching, simply by direct pressure exerted normally to the seat.

A further feature of the preferred form of the die is a secondary or marginal working face 100, surrounding the main working face 98 and rim 99 at the sides and back, in the form of a shoulder, this secondary face being adapted to press down and smooth the overlasted portion of the upper around the heel seat proper of the shoe and form a flat periphery on the heel-seat for the reception of the rim of a wood heel.

In the preferred embodiment, the die is also provided, at the back, with a depending extension or shield 96 curved to receive the back of the shoe. This shield further protects the shoe against injury under pressure, affords a back stop for the shoe when the latter is swung back beneath the die, and automatically and finally positions the shoe in the longitudinal sense as the die is forced down, the inner rear surface of the shield being suitably inclined as indicated at 101.

Figures 14, 15, 18, 19:
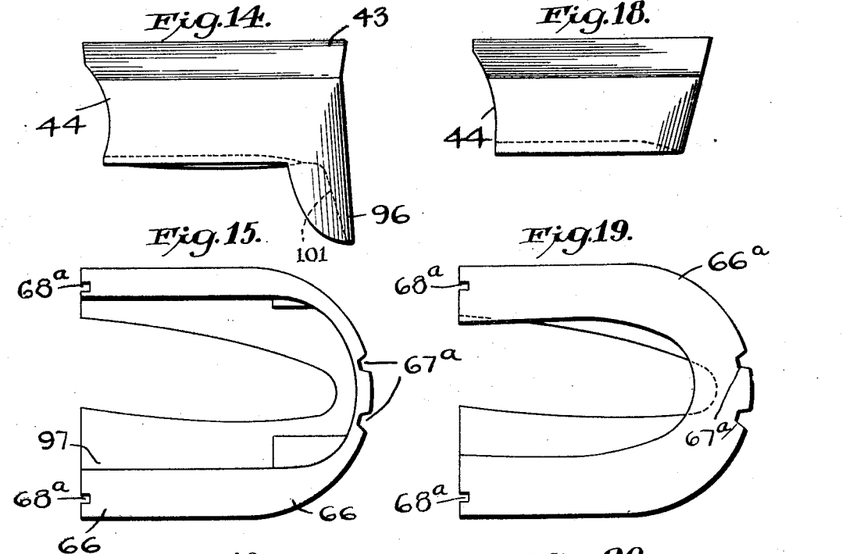
Fig. 14 is a side elevation thereof.
Fig. 15 is a plan view of an insert used in the clamping jaws with the form of mould shown in Figs. 13 and 14.
Fig. 18 is a side elevation thereof.
Fig. 19 is a plan view of the insert used in the clamping jaws with the form of mould shown in Figs. 17 and 18.
Figure 16:
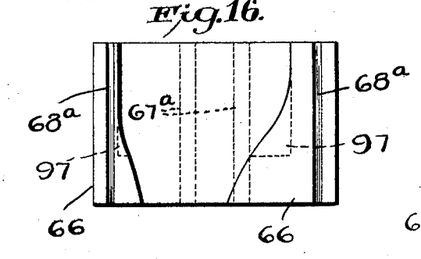
Fig. 16 is an end view thereof.

To accommodate the shield 96 and the shoulder 100 the yielding insert 66 of the shoe-holder has to be appropriately cut away as shown at 97 in Figs. 15 and 16.

Figure 17:
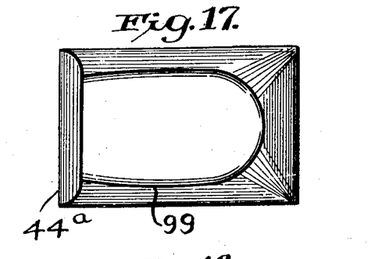
Fig. 17 is a bottom plan view of another form of die or mould.
Figure 20:
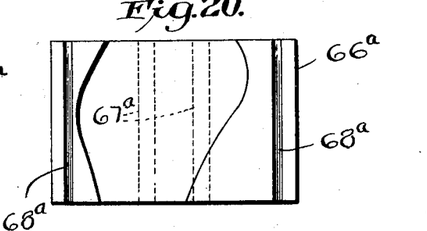
Fig. 20 is an end view thereof.

The form of the die 44ª illustrated in Figs. 17 and 18 possesses the main seat-forming working face 98 and rim 99, but lacks the shoulder face 100 and the shield 101. When a die of this character is employed an insert 66ª, such as shown in Figs. 19 and 20, can be used, this form of insert not having the cut-away region 97.

Figure 1:
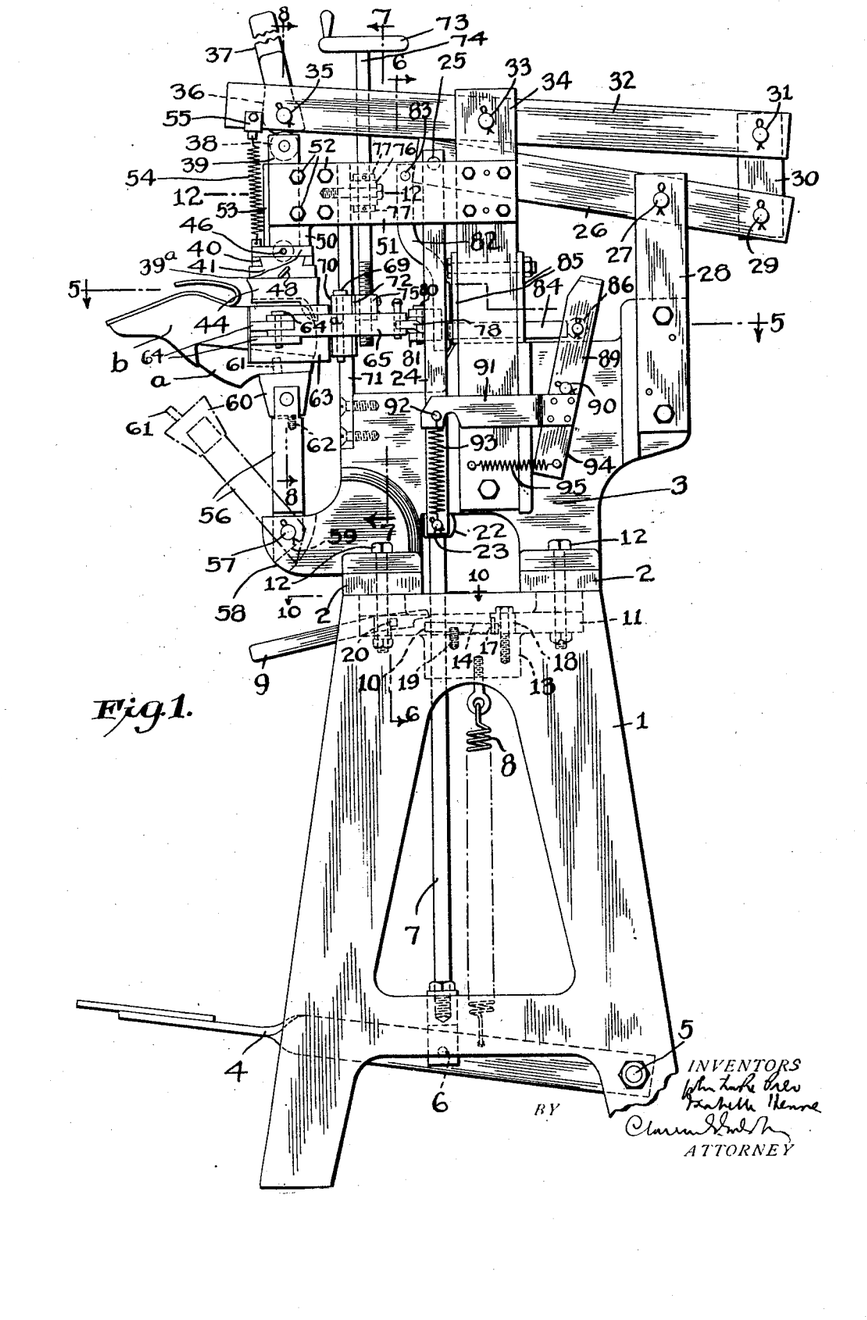
Fig. 1 is a side elevation of the machine, showing the shoe in place preparatory to applying the pressure.
Figure 2:
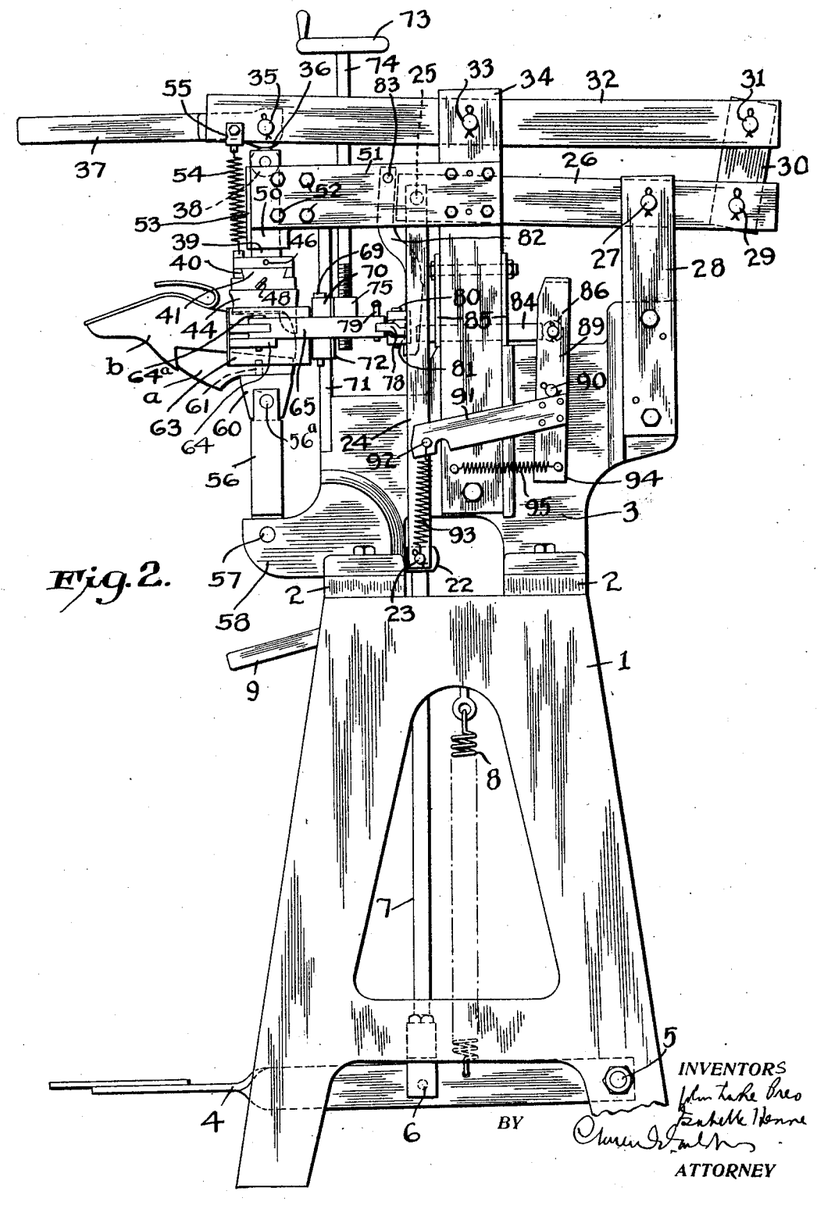
Fig. 2 is a similar view showing the treadle depressed, the pressure being applied, and the parts in the position they would assume when the heel seat is being formed.
Figure 3:
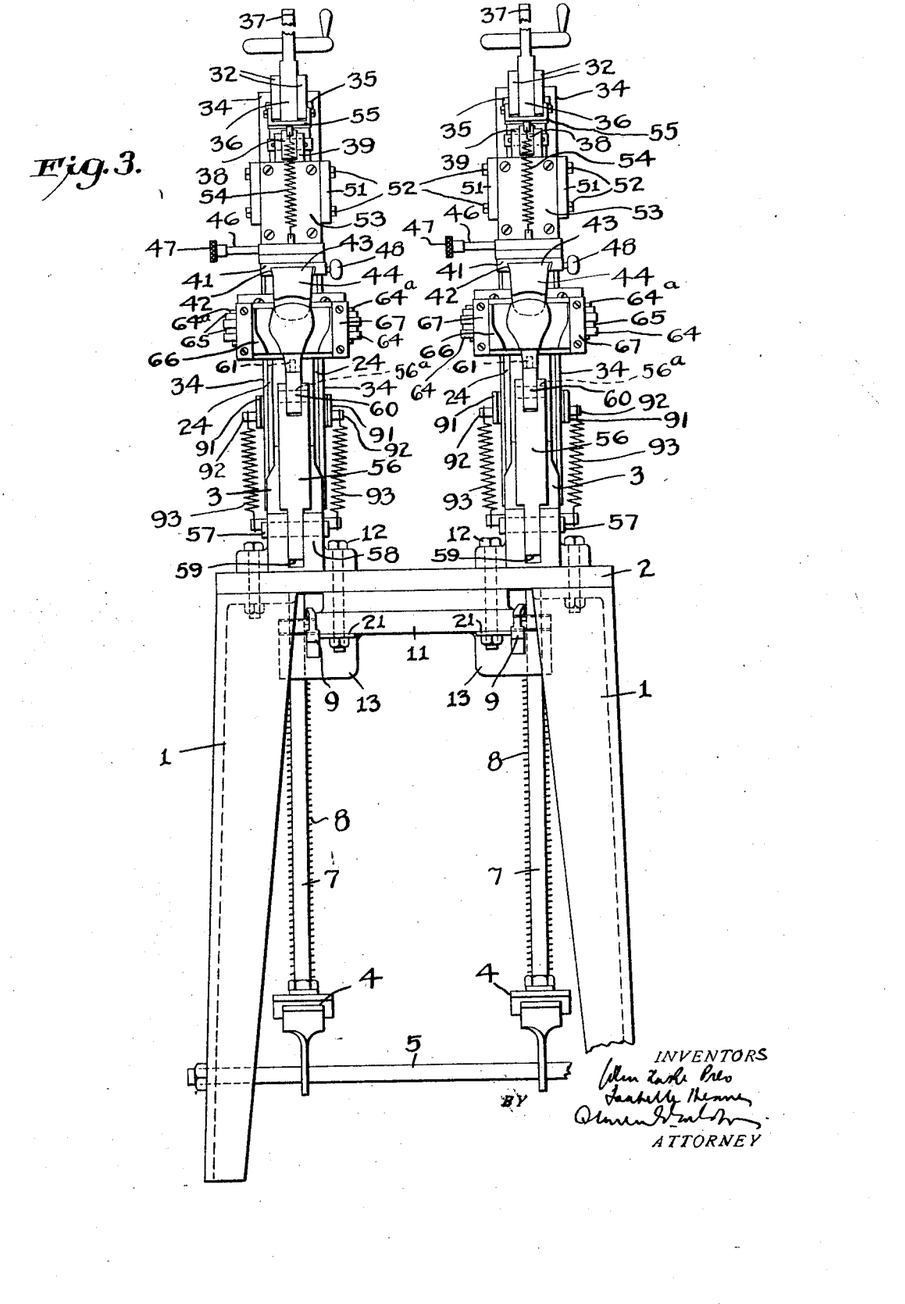
Fig. 3 is a front view of the machine.
Figure 4:
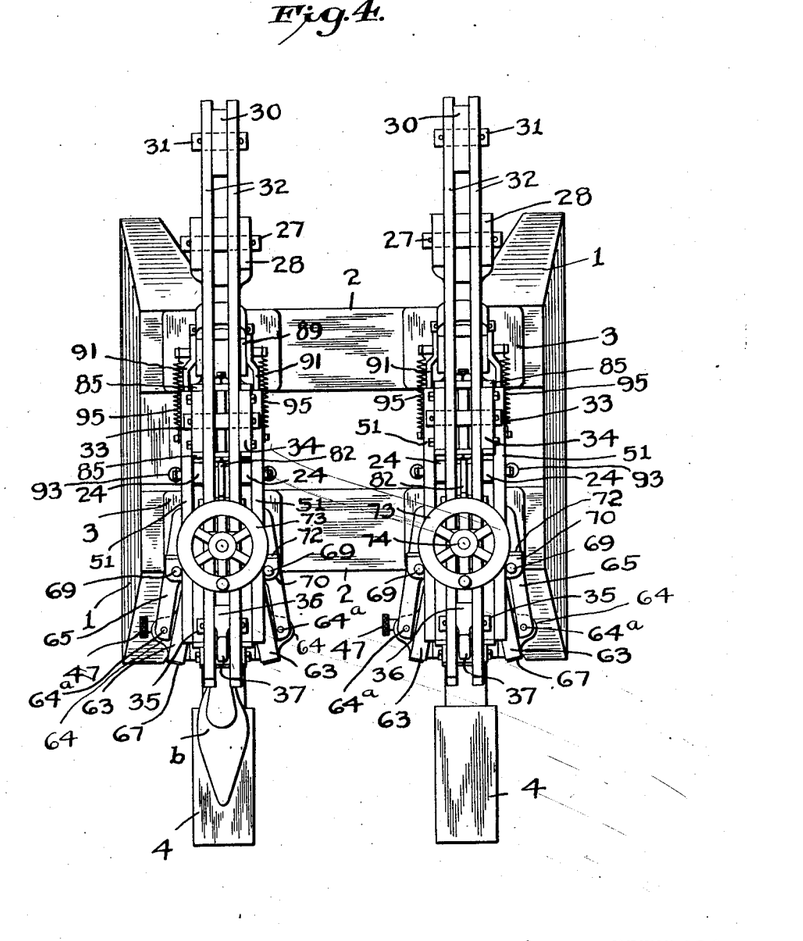
Fig. 4 is a top plan view.

In the operation of the machine the post 56 is swung outward to the dotted position shown in Fig. 1, the last of the shoe is placed on the last pin 61, and post and shoe are swung back to the operative position, the other parts of the machine all being in the position shown in Fig. 1. The foot treadle 4 is then depressed, causing the spring 93 to pull down on the arm 91 of the bell-crank lever, which through its other arm 89 forces the push-bar 84 against the member 82, which pushes forward the block 81, links 78, and levers 65, forcing the shoe-holding jaws 63 toward each other, the rubber insert in the jaws firmly grasping the shoe. Simultaneously the die has been forced down upon the heel seat through the medium of the link 24, levers 26 and 32 connected by link 30, cam 36, roller 38 and plunger 39, the cam having its low portion resting on the roller. In this way a very powerful pressure is obtained through the leverage, and the pressure is automatically held by the clutch device 14, which prevents the die from rising when the foot pressure on the treadle is removed. In order to exert the maximum pressure on the heel seat, the cam handle 37 is brought forward and down to a horizontal position, shown in Fig. 2, the high part of the cam being thus brought in contact with the roller, forcing the plunger and die still further and thereby exerting heavy additional pressure. The cam is self-holding in this position, and the clutch 14 continues to hold the pressure mechanism as a whole against relaxing. After being left under this pressure for a short time the heel seat is formed, and the handle 9 is raised, thus releasing the clutch and permitting the die to rise and the other parts, with the exception of the cam, to be restored under the action of the springs. The post may then be pulled out and the shoe with finished heel seat removed. The cam is returned to initial position by hand, and is self-holding in this position also, the cam and roller being always held forcibly in contact by the spring 54.

If still more pressure is required, the handle 9 is not tripped, but the cam is turned back to the initial position shown in Fig. 1, and a permanent set having been given to the heel seat, the cam and die both may be forced to a new position down upon the heel seat by pressure on the treadle 4 acting through the levers. The clutch holds this new position, and the cam is again operated, thus compressing the heel seat still further. This may be repeated as often as desired, but in most cases a single operation through the compound leverage effected by the primary operating member 4, followed by an operation of the secondary member 37 acting through the cam 36 included in the main train of connections, will be sufficient; and an operation with the member 4 alone will produce a useful effect.

The raising or lowering of the shoe-holder, through the hand-wheel 73 and screw-rod 74, to the position of best cooperation with the shoe, and fore and aft and lateral positioning of the die by means of the devices described so as to act truly upon the heel seat, are effected prior to the operation of the mechanism actuated from the operating members 4 and 37, and are altered whenever there is a variation in the shoes, or are allowed to remain as set if the shoes being operated upon are uniform.

Figures 8, 9:
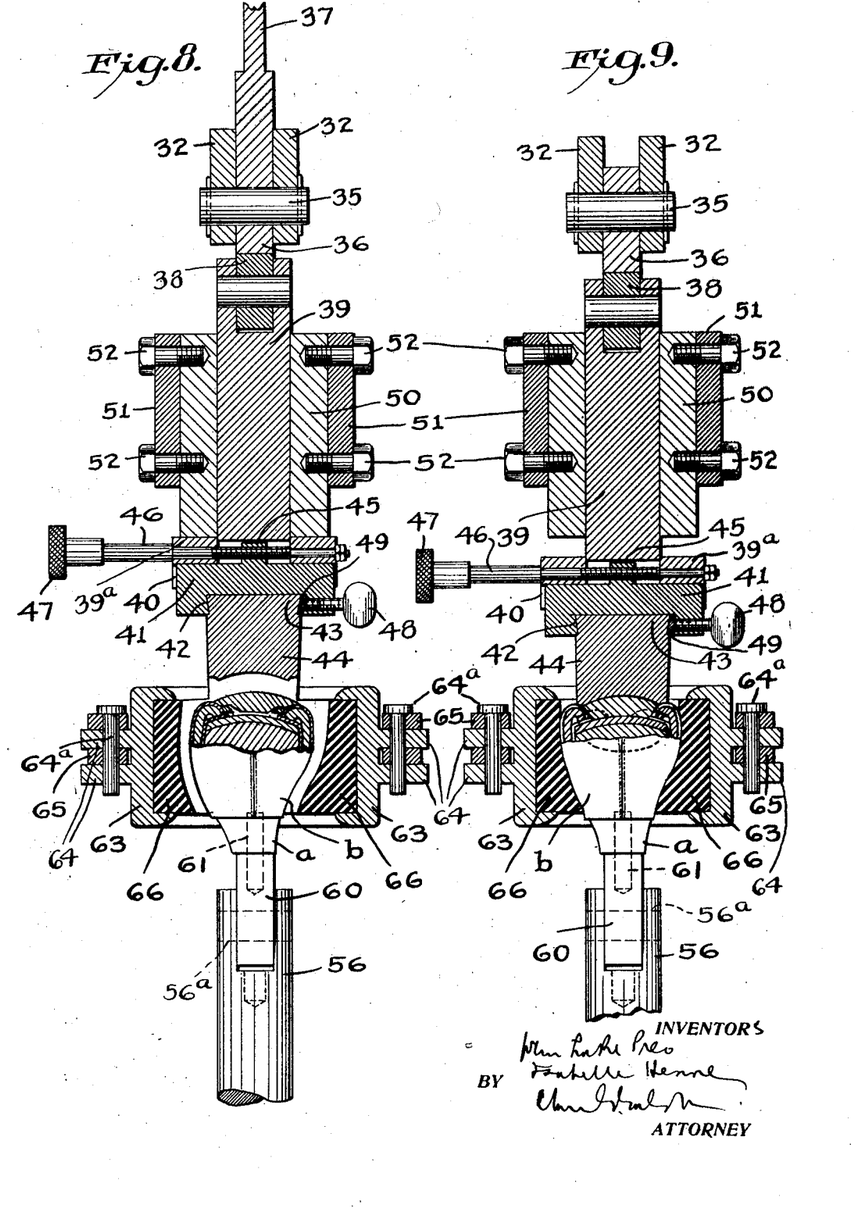
Fig. 8 is a vertical section on the line 8—8 of Fig. 1, showing the parts in position before the pressure has been applied.
Fig. 9 is a similar view showing the parts in position after the pressure has been applied.
Figure 10:
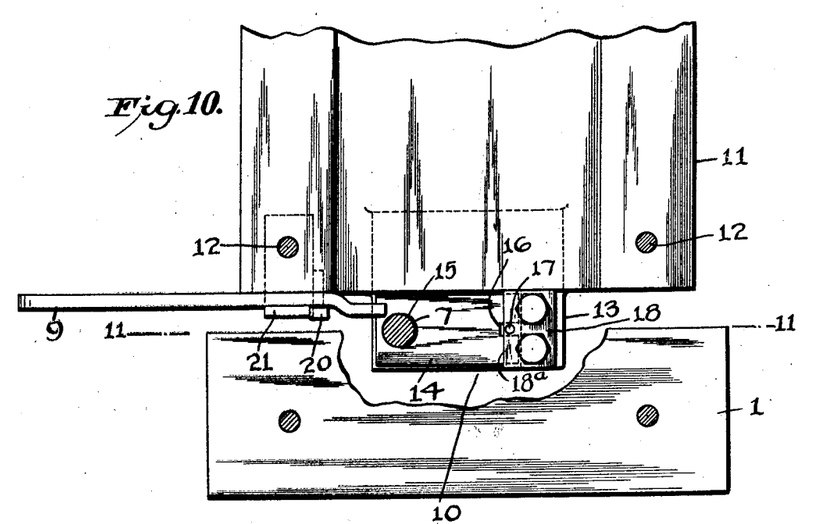
Fig. 10 is a fragmentary detail view taken on the line 10—10 of Fig. 1.

Figs. 8 and 9 illustrate the effect of the machine upon the heel seat. Fig. 8 shows the lasted shoe preparatory to having the heel seat moulded thereon, indicating the irregular and rough condition of the heel seat in its natural condition. Fig. 9 shows the mould in the act of forming the heel seat. After the pressure has been relieved and the mould taken off, the heel seat has a smooth, even, convexly rounded surface exactly conforming to the cupped shape of the heel to be attached thereto.

A form of die herein shown has been disclosed and claimed in a division of this application which has matured into Letters Patent of the United States No. 1,444,085, granted February 6, 1923.

In conclusion, it will be understood that numerous changes may be made without departing from the invention, and that various features may be used without others or in specifically different applications.

What is claimed as new is:

1. A machine of the character described, having a support for a shoe, a heel seat die, one of said members being mounted for pressure movement perpendicular to the heel seat, pressure mechanism operative upon said member, a shoe-holder adapted to grasp the shoe adjacent to the heel seat, and means for yieldingly actuating the shoe-holder to grasp the shoe with force substantially proportional to the pressure produced between the die and shoe-support.

2. A machine of the character described having a shoe-support, a heel seat die, one of said members being mounted for pressure movement perpendicular to the heel seat, operating mechanism for producing pressure between said members, a shoe-holder comprising a pair of jaws and a cushion insert adapted to grasp the shoe adjacent to the heel seat, and mechanism including a spring connection for actuating the shoe-holder jaws from said operating mechanism.

3. In a machine for forming heel-seats of shoes for the reception of cupped wood heels, the combination of a shoe support arranged to hold a last bottom up, a rigid die for exerting localized pressure confined to the heel-seat of a shoe to compress and shape the heel-seat to the shape of the die for the reception of a heel, means for relatively moving the die and the support and holding them in pressing relation, and additional means comprising a cam arranged for manual operation for effecting further relative movement of the die and support to form the heel-seat.

4. In a machine for preparing heel-seats of shoes for the reception of cupped wood heels, the combination of a shoe support to hold a shoe bottom up, a rigid die for compressing and forming the heel-seat of a shoe to a shape approximately complementary to that of the cup of a wood heel, means comprising positively acting levers and a locking device for relatively moving the die and support and holding them in pressing relation, and additional means comprising a cam under the operator's control for increasing the pressure, said means and said additional means being independently and alternately operable to increase the pressure.

5. In a machine for preparing heel-seats of shoes for the reception of cupped wood heels, the combination of a rigid heel-seat forming die for exerting localized pressure confined to the heel-seat of a shoe to compress and shape the heel-seat, a shoe support, manually operated positively acting means for relatively moving the die and support to effect action of the die upon the heel-seat, means for maintaining the die and shoe in pressing relation, and unyielding additional means under the operator's control whereby a positive relative movement of the die and support may be effected.

6. In a machine for operating upon the heel seat portions of shoes, a shoe-support, a die-carrier, treadle-operated mechanism for exerting pressure through one of said members, a clutch for said mechanism, and a handle-operated device for producing additional pressure, said device being interposed in the transmission between the treadle and the member.

7. In a machine for operating upon the heel seat portions of shoes, a sliding die-carrier, a pressure mechanism terminating in a lever acting on said die-carrier, a clutch for said mechanism, and a cam between said lever and die-carrier provided with a handle for exerting additional pressure.

8. A machine of the character described, having a shoe-support, a heel seat die, treadle-operated mechanism for exerting pressure on the die, a device interposed between the treadle-operated mechanism and the die for exerting additional pressure, an automatic clutch for the treadle-operated mechanism having a handle for releasing it, and a handle for operating the additonal pressure device.

9. A machine of the character described, having a shoe-support, a heel seat die, primary operating mechanism for exerting pressure on the die, a self-holding cam interposed between the primary operating mechanism and the die for applying additional pressure, an automatic clutch for the primary mechanism having a handle for releasing it, and a handle for applying and releasing the cam-pressure.

10. In a machine of the character described, a last support member arranged to hold a last bottom up, a rigid heel-seat die member for exerting localized pressure confined to the heel-seat of a shoe to compress and shape the heel-seat for the reception of a wood heel, a manually operable primary means for relatively moving the last support and the die to bring them into engagement, and a secondary means for relatively moving the die and support for producing a molding pressure.

11. In a machine for operating on the heel seat portions of shoes, a shoe-support, a shoe-holder adapted to grasp the shoe adjacent to the heel, means whereby the shoe-holder is movable up and down relatively to the shoe-support, and mechanism for actuating the shoe-holder to grasp the shoe including a device for permitting the up and down movement of the shoe-holder relatively to said actuating mechanism.

12. In a machine for operating on the heel seat portions of shoes having a suitable frame, a vertically movable shoe-holder adapted to grasp the shoe adjacent to the heel seat, said shoe-holder comprising jaws and operating members and a vertically movable carrier therefor, an operating mechanism mounted on the frame, and an operative connection between a terminal part of the mechanism on the frame and a part of the members on the movable carrier, said connection extending substantially vertically so as to preserve operative relation at all times.

13. In a machine for operating on the heel seat portions of shoes having a suitable frame, a vertically movable shoe-holder adapted to grasp the shoe adjacent to the heel seat, said shoe-holder comprising jaws and operating members and a vertically movable carrier therefor, a main operating mechanism on the frame, a horizontal push-rod connected therewith, and a substantially-vertically-extending operative connection between said push-rod and a part of the members on the shoe-holder carrier.

14. In a machine for operating on the heel seat portions of shoes having a suitable frame, a vertically movable shoe-holder adapted to grasp the shoe adjacent to the heel seat, said shoe-holder comprising jaws and operating members and a vertical movable carrier therefor, an operating mechanism mounted on the frame, and a substantially-vertically-extending member pivoted on the frame between a terminal part of the mechanism on the frame and a part of the operating members on the shoe-holder carrier.

15. In a machine for operating on the heel seat portions of shoes, a shoe-holder adapted to grasp the shoe adjacent to the heel seat, comprising a pair of jaws, a pair of levers to which the jaws are pivoted, a toggle connecting said levers and comprising a pair of pivotally connected links, and means for operating the toggle.

16. In a machine for operating on the heel seat portions of shoes having a suitable frame, a vertically movable shoe-holder adapted to grasp the shoe adjacent to the heel seat, said shoe-holder comprising jaws, levers to which said jaws are pivoted, a toggle connecting said jaws, and a vertically movable carrier for the whole; an operating mechanism on the frame, and a substantially-vertically-extending operative connection between a terminal member of said mechanism and the said toggle.

17. In a machine of the character described, a support for an inverted shoe, a vertically movable die-carrier, a heel seat forming die carried thereby, devices for positioning said die forwardly and rearwardly and laterally on the die-carrier, and mechanism for exerting pressure through the die-carrier to form the heel seat on the shoe.

18. In a machine of the character described, a support for the lasted shoe, a vertically slidable plunger die-carrier, a heel seat die carried on the bottom of said carrier, means thereon for positioning the die forwardly and rearwardly and laterally, and pressure mechanism operative on the die-carrier.

19. In a machine for operating on the rear portions of shoes, a die, a treadle lever, an upwardly extending pull connection connected to said treadle lever, lever means to which the upper end of said pull connection is connected for applying pressure to the die, an automatic clutch to act upon said pull connection, and a handle for releasing said clutch.

20. In a machine for operating on the rear portions of shoes, a die, a treadle lever, an upwardly extending pull connection connected to said treadle lever, lever means to which the upper end of said pull connection is connected for applying pressure to the die, an automatic clutch to act upon said pull connection, a handle for releasing said clutch, said clutch comprising a tilting plate having a hole slightly larger than the pull connection so as to grip the same at any point, a support on which the plate tilts, and means for confining the plate at one end against upward movement.

21. In a machine for operating on the rear portions of shoes, a die, a treadle lever, an upwardly extending pull connection connected to said treadle lever, lever means to which the upper end of said pull connection is connected for applying pressure to the die, an automatic clutch to act upon said pull connection, a handle for releasing said clutch, said clutch comprising a tilting plate having a hole slightly larger than the pull connection so as to grip the same at any point, a support on which the plate tilts, a spring tilting the plate upward, and means for confining the plate at one end against upward movement.

22. In a machine for operating on the heel seat portions of shoes, a shoe-support, a vertically guided die-carrier, an operating treadle, a pull connection extending upward therefrom, lever means operated by said pull connection for applying pressure to the die-carrier, a shoe-holder adapted to grasp the shoe adjacent to the heel seat, and mechanism branching off from the pull connection for actuating said shoe-holder.

23. In a machine for operating on the heel seat portions of shoes, a shoe-support, a vertically guided die-carrier, an operating treadle, a pull connection extending upward therefrom, lever means operated by said pull connection for applying pressure to the die-carrier, a shoe-holder adapted to grasp the shoe adjacent to the heel seat, a bell-crank connected to the pull connection, a horizontal push-rod connected to the bell-crank, and means whereby said push-rod actuates said shoe-holder.

24. In a machine for forming heel-seats of shoes for the reception of cupped wood heels, the combination of a shoe support, a die having a horseshoe-shaped rim and a concave central portion, manually operable means for effecting relative movement of the die and support to put the heel-seat of the shoe under light pressure while the operator properly relatively locates the periphery of the die and the periphery of the heel-seat of the shoe, and additional means for effecting relative movement between the die and shoe support and capable of producing heavy pressure.

25. In a heel-seat forming machine, the combination of a shoe support, a heel-seat die having a horseshoe-shaped rim and a concave central portion, and a pair of devices for positively effecting relative movement of the support and die, said devices being arranged for operation in turn one to increase the pressure effected by the other.

26. In a heel-seat forming machine, the combination of a shoe support, a heel-seat die having a horseshoe-shaped rim and a concave central portion, and a pair of devices for effecting relative movement of the support and die, said devices being constructed and arranged for successive operation one to effect a positive preliminary pressure between the shoe and die and the other to augument the preliminary pressure.

27. In a machine of the class described, a shoe support member, a heel-seat die member adapted to act on the heel-seat of a shoe for exerting localized pressure confined to the heel-seat and two devices for effecting relative movement of said members to produce pressure of the die upon the heel-seat, one device comprising a cam and the other comprising positively connected link members for effecting said relative movement.

28. In a machine of the class described, a shoe support member, a heel-seat die member adapted to act on the heel-seat of a shoe for exerting localized pressure confined to the heel-seat to give the heel-seat the form of the die, and two devices for effecting movement of the die member to produce pressure of the die upon the heel-seat, one device comprising a cam acting on the die member and the other device comprising inextensible link members acting also on the die member.

29. In a machine for forming heel-seats of shoes for the reception of wood heels, the combination of a rigid die for exerting localized pressure confined to the heel-seat of a shoe and to compress and shape the heel-seat to the form of the die, a die support, a last support, means for relatively moving the die support and last support for pressing the die upon the shoe, and a hand operated cam member between the die and its support for moving the die toward the last support.

30. In a machine for forming heel-seats of shoes for the reception of wood heels, the combination of a heel-seat die for compressing the heel-seat of a shoe and to shape the heel-seat to the form of the die, a die support, a last support, means for relatively moving the die support and the last support for pressing the die upon the shoe, and a hand-operated cam member for moving the die toward the last support and for sustaining the die against movement during the heel-seat forming operation.

JOHN LAKE PREO.
ISABELLE HENNE.